(12) United States Patent
Ju et al.

(10) Patent No.: US 11,670,795 B2
(45) Date of Patent: Jun. 6, 2023

(54) BATTERY MODULE

(71) Applicant: SK INNOVATION CO., LTD., Seoul (KR)

(72) Inventors: Seung Hoon Ju, Daejeon (KR); Kwan Yong Kim, Daejeon (KR); Sol San Son, Daejeon (KR)

(73) Assignee: SK ON CO., LTD., Seoul (KR)

( * ) Notice: Subject to any disclaimer, the term of this patent is extended or adjusted under 35 U.S.C. 154(b) by 37 days.

(21) Appl. No.: 17/363,725

(22) Filed: Jun. 30, 2021

(65) Prior Publication Data

US 2021/0328296 A1  Oct. 21, 2021

Related U.S. Application Data

(63) Continuation of application No. 15/850,852, filed on Dec. 21, 2017, now Pat. No. 11,088,410.

(30) Foreign Application Priority Data

Dec. 23, 2016 (KR) .................. 10-2016-0177900
Mar. 31, 2017 (KR) .................. 10-2017-0041875
Dec. 21, 2017 (KR) .................. 10-2017-0177048

(51) Int. Cl.
*H01M 10/04* (2006.01)
*H01M 50/528* (2021.01)
(Continued)

(52) U.S. Cl.
CPC ....... *H01M 10/0413* (2013.01); *B23K 26/244* (2015.10); *H01M 10/486* (2013.01); *H01M 50/209* (2021.01); *H01M 50/50* (2021.01); *H01M 50/503* (2021.01); *H01M 50/509* (2021.01); *H01M 50/512* (2021.01);
(Continued)

(58) Field of Classification Search
None
See application file for complete search history.

(56) References Cited

U.S. PATENT DOCUMENTS

2017/0106470 A1* 4/2017 Solomon ............ B23K 26/0665
2017/0331097 A1* 11/2017 Lee .................... H01M 50/50

FOREIGN PATENT DOCUMENTS

JP    2005327677 A  * 11/2005
JP    2007-265945 A   10/2007
(Continued)

OTHER PUBLICATIONS

Walter etal.; "Nothing Less Than More Affordable Lithium-Ion Batteries", www.laser-journal.de; pp. 44-47. (Year: 2014).*
(Continued)

*Primary Examiner* — Gregg Cantelmo
(74) *Attorney, Agent, or Firm* — IP & T Group LLP

(57) ABSTRACT

Embodiments of the present disclosure relate to a battery module. According to an embodiment of the present disclosure, there is provided a battery module including a plurality of battery cells each including at least one electrode tab, and a bus bar in contact with the electrode tabs to electrically connect the plurality of battery cells, wherein the bus bar includes a plate in which a plurality of holes are formed, and the electrode tabs are inserted into at least a portion of the plurality of holes to electrically connect the plurality of battery cells.

18 Claims, 17 Drawing Sheets

SECTION A-A'

(51) Int. Cl.
*H01M 50/512* (2021.01)
*H01M 50/50* (2021.01)
*H01M 50/516* (2021.01)
*H01M 50/509* (2021.01)
*H01M 50/548* (2021.01)
*H01M 50/553* (2021.01)
*H01M 50/209* (2021.01)
*H01M 50/503* (2021.01)
*H01M 10/48* (2006.01)
*B23K 26/244* (2014.01)
*B23K 103/10* (2006.01)
*B23K 103/12* (2006.01)

(52) U.S. Cl.
CPC ....... *H01M 50/516* (2021.01); *H01M 50/528* (2021.01); *H01M 50/548* (2021.01); *H01M 50/553* (2021.01); *B23K 2103/10* (2018.08); *B23K 2103/12* (2018.08); *H01M 2200/10* (2013.01)

(56) References Cited

FOREIGN PATENT DOCUMENTS

| | | | |
|---|---|---|---|
| JP | 2012-252811 A | | 12/2012 |
| JP | 2012252811 A | * | 12/2012 |
| JP | 2013-026191 A | | 2/2013 |
| JP | 2015-065055 A | | 4/2015 |
| JP | 2016-039091 A | | 3/2016 |

OTHER PUBLICATIONS

Machine translation of JP 2012-252811 A. (Year: 2012).*
First Office Action for application CN201711408370.9 issued by the Chinese Patent Office dated May 20, 2022.

* cited by examiner

SECTION A-A'

BATTERY MODULE

CROSS-REFERENCE TO RELATED APPLICATION

This application is a continuation of U.S. patent application Ser. No. 15/850,852 filed on Dec. 21, 2017 U.S. Pat. No. 11,088,410, issued on Aug. 10, 2021, which claims priority to and the benefit of Korean Patent Application No. 10-2016-0177900, filed on Dec. 23, 2016, Korean Patent Application No. 10-2017-0041875, filed on Mar. 31, 2017 and Korean Patent Application No. 10-2017-0177048, filed on Dec. 21, 2017, the disclosures of which are incorporated herein by reference in their entirety.

BACKGROUND

1. Field of the Invention

Exemplary embodiments of the present disclosure relate to a battery module.

2. Discussion of Related Art

More powerful secondary batteries that can be charged and discharged many times are actively being researched due to their use in advanced fields such as digital cameras, cellular phones, laptop computers, hybrid vehicles, and the like. Examples of secondary batteries include a nickel-cadmium battery, a nickel-metal hydride battery, a nickel-hydrogen battery, and a lithium secondary battery. The lithium secondary battery typically has an operating voltage of 3.6 V or higher and can be used as a power source for portable electronic devices. Also, a plurality of lithium secondary batteries connected in series can be used to power a high-output hybrid vehicle. Use of the lithium secondary battery has rapidly increased because its operating voltage thereof is approximately three times higher than that of the nickel-cadmium battery or the nickel-metal hydride battery. Also, the lithium secondary battery has excellent energy density per unit of weight.

Typically, a bus bar is brought into contact with the electrode tabs of battery cells for connecting a plurality of battery cells. A conventional bus bar is formed to have a C shape. Electrode tabs may be brought into contact with a C-shaped bus bar so that two or more battery cells can be electrically connected. Connecting the battery cells may require at least one of cutting and bending the electrode tabs of the battery cells. As the number of battery cells, e.g. three battery cells, four battery cells, or the like (that is, parallel connection of three cells or parallel connection of four cells) to be connected varies, the cutting and bending dimensions of electrode tabs also vary. Because existing battery modules require deforming the electrode tabs for coupling the battery cells, the number of required process operations is increased, which in turn renders the manufacturing process more complicated and increases its cost.

SUMMARY OF THE INVENTION

Embodiments of the present disclosure provide a battery module allowing the number of assembling processes to be reduced due to electrode tab processing for electrically connecting a plurality of battery cells being simplified.

Other embodiments of the present disclosure provide a battery module capable of preventing deformation of shapes of electrode tabs by a shape of a bus bar being deformed.

Other embodiments of the present disclosure provide a battery module allowing costs to be reduced according to a reduction in the number of processes.

Other embodiments of the present disclosure provide a battery module capable of uniformly melting electrode tabs when a plurality of battery cells are electrically connected to each other.

Other embodiments of the present disclosure provide a battery module allowing a connection state to be visually confirmed when a plurality of battery cells are electrically connected by welding or the like.

According to an aspect of the present disclosure, there is provided a battery module including a plurality of battery cells each including at least one electrode tab, and a bus bar in contact with the electrode tabs to electrically connect the plurality of battery cells, wherein the bus bar includes a plate in which a plurality of holes are formed, and the electrode tabs are inserted into at least a portion of the plurality of holes to electrically connect the plurality of battery cells.

Each of the plurality of electrode tabs may be inserted into the corresponding one of the plurality of holes and fixed.

The electrode tab may be inserted into one side of the plate and protrude to the other side of the plate.

The electrode tab may protrude by a length of 1 to 3 mm from an outer end of the hole.

The plate may include a protruding portion formed at a periphery of a position at which the hole is formed.

A cross-section of the periphery of the hole may be formed to be tapered toward one side of the plate so that the electrode tab may be inserted into the hole.

A width of an entry space into which the electrode tab enters at the one side of the plate may be reduced near the hole.

The plate may include a tab connection portion configured to protrude from an outer periphery of the hole to an outside of the plate.

The electrode tab and the plate may be connected to have a wobble welding shape by laser welding.

The hole may be formed to correspond to a thickness and a length of the electrode tab.

A sum of both gaps between the hole and the electrode tab inserted into the hole may range from 0.1 mm to 0.2 mm.

The electrode tab may be formed in a straight line without being bent.

At least one electrode tab includes a bent portion and a straight portion, and at least a part of the straight portion is inserted into its respective hole.

The at least one electrode tab may include an insulating portion formed on at least a portion of the electrode tab, and the bent portion may be formed on the insulating portion.

The battery module may further include a support plate in which a plurality of support holes corresponding to the holes are formed and the support plate may be located between the plurality of battery cells and the bus bar.

The bent portion may be formed at the electrode tab and the bent portion may be supported to be in contact with one side of the support hole.

The battery module may further include a fixing plate in which a plurality of bus bar exposure holes corresponding to the holes are formed and the bus bar may be located between the support plate and the fixing plate and may be fixedly supported thereby.

A plurality of bus bars may be provided, at least two of the plurality of electrode tabs may be connected to at least one of the plurality of bus bars in parallel to form a parallel assembly, and a plurality of the parallel assemblies may be provided and connected in series or in parallel.

According to another aspect of the present disclosure, there is provided a method of manufacturing a battery module including providing a plurality of battery cells stacked in parallel next to each other, each battery cell including an electrode tab, providing a bus bar comprising a plurality of holes formed at a regular interval and configured to receive the plurality of electrode tabs, positioning the bus bar adjacent to the battery cells so that the plurality of holes of the bus bar are positioned adjacent to the plurality of corresponding electrode tabs, inserting the plurality of electrode tabs into the corresponding holes of the bus bar, and fixing the electrode tabs to the bus bar.

The electrode tab may protrude toward the other side of the plate.

The electrode tab may protrude by a length of 1 to 3 mm from an outer end of the hole.

The said fixing operation may include welding the electrode tabs to the bus bar.

The said welding operation may include laser welding of only the electrode tabs and not of the bus bar.

The laser may be repeatedly applied to an end surface of the electrode tab in a shape of a circle, and centers of the circles may be located along an axis of a longitudinal direction of the end surface.

The laser may be applied to the electrode tab obliquely with respect to a central axis of a longitudinal direction thereof.

A support plate may be arranged between the plurality of battery cells and a bus bar, and the electrode tab may be positioned to pass through a support hole of the support plate.

The bus bar may be coupled to at least a portion of the support plate and may be fixedly supported thereby.

A fixing plate may be arranged at another side of the bus bar, and the hole may be exposed to the outside through a bus bar exposure hole of the fixing plate.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the drawings. However, we note that these embodiments are only examples of the present invention and are not intended to limit the present disclosure.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

Detailed descriptions of well-known structures and functions which may unnecessarily obscure the present disclosure are omitted. Some terms described below are defined in consideration of functions in the present disclosure, and meanings thereof may vary depending on, for example, a user or operator's intentions or customs. Therefore, the meanings of terms should be interpreted on the basis of the scope of the present disclosure throughout this specification.

Hence, it should be understood that the spirit and scope of the present invention are defined by the appended claims and that the following embodiments serve the purpose of describing the technological scope of the present invention to those skilled with ordinary skill in the art to which the present invention belongs.

Hereinafter, the various embodiments of the present invention will be described in detail with reference to the attached drawings.

Figure 1:
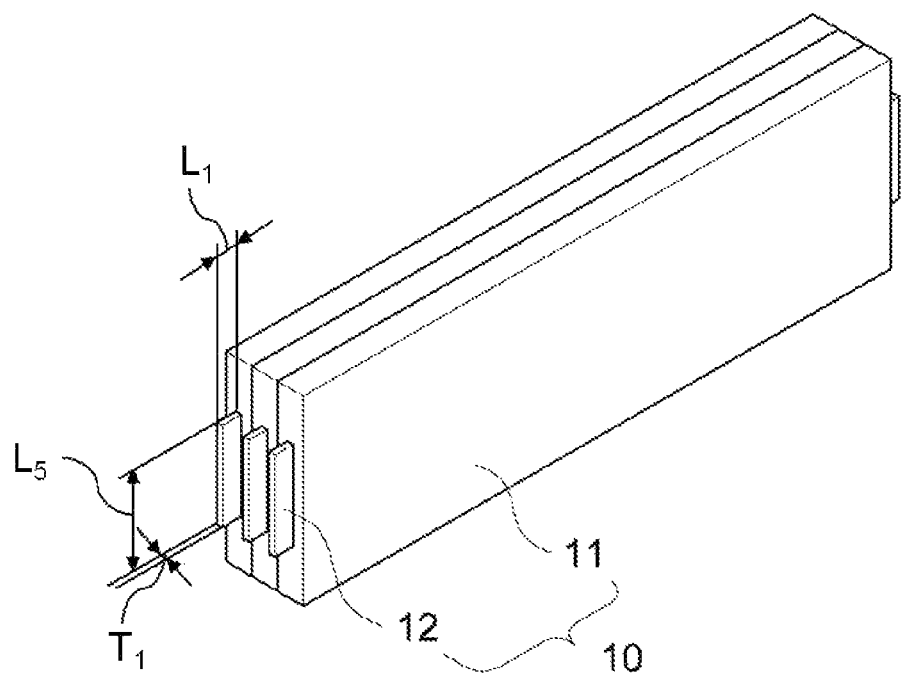
FIG. 1 is a view illustrating a secondary battery according to an embodiment of the present disclosure.
Figure 2:
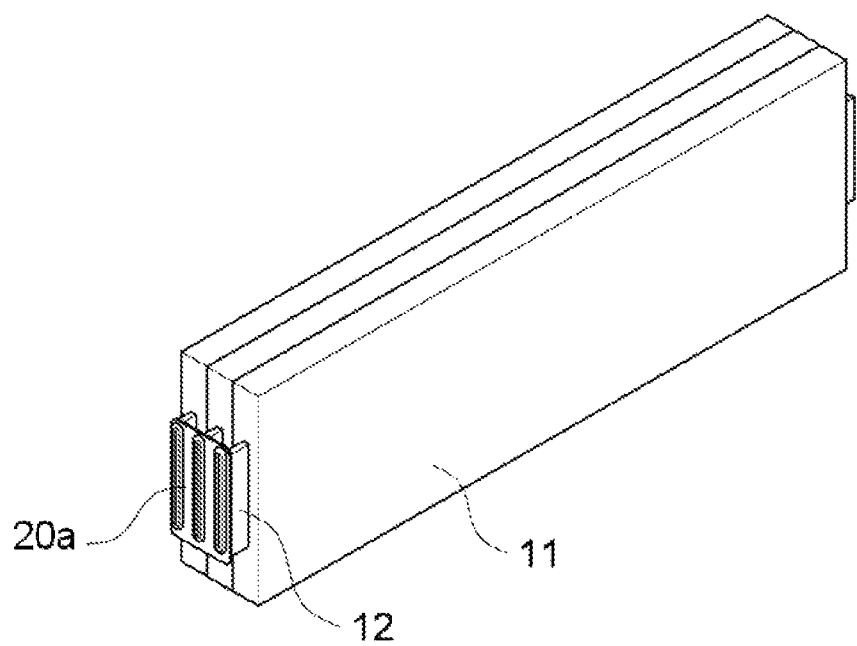
FIG. 2 is a view illustrating a state in which a bus bar is brought into contact with the secondary battery according to an embodiment of the present disclosure.
Figure 3A:
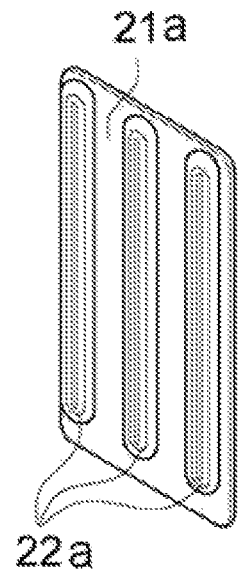
FIGS. 3A and 3B are views illustrating the bus bar according to an embodiment of the present disclosure.
Figure 3B:
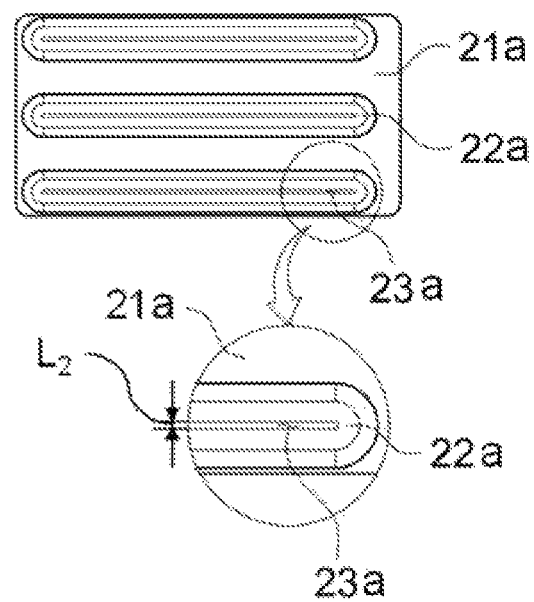

FIG. 1 is a view illustrating a secondary battery 10 according to an embodiment of the present disclosure. FIG. 2 is a view illustrating a state in which a bus bar 20a is arranged on the secondary battery. FIGS. 3A and 3B are views illustrating the bus bar 20a. In describing the secondary battery 10 and the bus bar 20a, references will be made to FIGS. 1, 2, 3A, and 3B.

Referring to FIG. 1, the secondary battery 10 may include a plurality of battery cells 11 and electrode tabs 12 drawn from the battery cells 11.

Referring to FIG. 2, the bus bar 20a according to the embodiment of the present disclosure may have a shape in which holes 23a (shown in FIG. 3B) are formed in a plate 21a (shown in FIG. 3). A plurality of holes 23a may be formed in the plate 21a, and an electrode tab 12 is welded to each of the holes 23a so that a plurality of welded battery cells 11 may be electrically connected. Since the electrode tabs 12 are inserted into the respective holes 23a, it is not necessary to deform the shape of the electrode tabs 12. The number of the plurality of holes 23a which are formed in the plate 21a of the bus bar 20a correspond to the number of the battery cells 11 to be connected thereto via the bus bar 20a. Therefore, the battery cells 11 may be electrically connected without changing the shape of the electrode tabs 12 regardless of the number of battery cells 11 to be connected in order to electrically connect the battery cells 11. Details of the plate 21a and the holes 23a will be described below.

Referring to FIGS. 3A and 3B, the bus bar 20a may include the plate 21a, protruding portions 22a, and the holes 23a. The plurality of holes 23a are formed in the plate 21a at predetermined intervals, and each may have a suitable shape and sufficient size so that the electrode tabs 12 can be inserted into the holes 23a for electrically connecting the plurality of battery cells 11. Each electrode tab 12 may be welded to the plate 21a after it is inserted into a corresponding hole 23a. Therefore, the plurality of welded battery cells 11 may be electrically connected. In the illustrated embodiment, each hole 23a may be formed to have a slit shape.

An area or size of the plate 21a may be determined according to the number of the battery cells 11 welded to the plate 21a. For example, when two battery cells 11 are electrically connected, the plate 21a may be formed to have an area or size to accommodate the two holes 23a in which the two electrode tabs 12, one from each of the two stacked battery cells 11, may be welded. Similarly, when three battery cells 11 are electrically connected, the plate 21a may be formed to have an area or size to accommodate the three holes 23a in which the three electrode tabs 12, one from each of the three stacked battery cells, 11 may be welded. Hence, the area or size of the plate 21a is determined according to the number of the battery cells 11 to be connected. Using the bus bar 20a according to an embodiment of the present disclosure, the battery cells 11 are electrically connected without having to change the shape of the electrode tabs. By changing the area or size of the plate 21a and the number of the holes 23a according to the number of the battery cells and their individual size, the bus bar 20a of the present invention can electrically couple the battery cells together without the need to change the shape of the electrode tabs 12 and/or cut the electrode tabs 12. Hence, unlike existing techniques, which are used for electrically coupling a plurality of battery cells to form a battery module, there is no need to employ an additional process of abutting the electrode tabs 12 to the bus bar which requires bending the electrode tabs 12, deforming the shape of the electrode tabs 12, and sometimes even cutting the electrode tabs. When the bus bar 20a of the present disclosure is used, only the steps of inserting the electrode tab 12 in the bus bar 20a and then connecting the electrode tab 12 and the bus bar 20a via welding are employed. Thus, bus bar 20a in accordance with the embodiment of the present disclosure simplifies the method of installing the bus bar for electrically coupling a plurality of battery cells to form a battery module. Specifically, as explained above, the present invention bus bar makes the abutting step by bending, deforming, and cutting of the electrode tab 12 unnecessary.

The protruding portions 22a may be formed at the bus bar 20a and have a convex shape according to the embodiment of FIGS. 3A and 3B. Each of the protruding portions 22a may be formed at a position at which a corresponding hole 23a is formed in the plate 21a. The protruding portions 22a are shaped to induce the electrode tab 12 to be inserted into the hole 23a. An enlarged view shown in FIG. 3B illustrates that the hole 23a is formed in the protruding portion 22a. Since the hole 23a is formed to correspond to a thickness $T_1$ and a length $L_1$ of the electrode tab 12, the hole 23a may be formed in the plate 21a to have a area corresponding to the thickness $T_1$ of the electrode tab 12. Therefore, each protruding portion 22a serves to more easily insert a corresponding electrode tab 12 into the hole 23a formed within the protruding portion 22a. Details thereof will be described with reference to FIGS. 5A and 5B.

The plurality of holes 23a may be formed in the plate 21a at predetermined intervals. The predetermined interval may be determined according to an interval between the battery cells 11 which in turn depends upon the width of the battery cells 11. Specifically, the predetermined interval may be determined according to a position at which the electrode tab 12 is inserted into the hole 23a. The number of the holes 23a may be determined according to the number of the battery cells 11 to be electrically connected.

Further, the hole 23a may be formed to have a width $L_2$ corresponding to those of the electrode tab 12. See FIG. 4A. The depth of the hole $L_6$ (shown in FIG. (A)) may correspond to the width of the plate 20a. The hole 23a may be formed to have a depth $L_6$ at which a state of the inserted electrode tab 12 may be maintained before welding. The electrode tab 12 is inserted into the hole 23a and is in contact with the plate 21a so that the bus bar 20a can be maintained in place even before the welding takes place. Securing the electrode tabs 12 within the respective holes 23a of the plate 21a may also be advantageous for facilitating the next step of welding the electrode tabs 12 with the plate 21a of the bus bar 20a.

The electrode tab 12 may be welded to the plate 21a in a state in which the electrode tab 12 is inserted into the hole 23a and is in contact with the plate 21a. Therefore, the plurality of battery cells 11 welded to the bus bar 20a may be electrically connected.

Figure 4A:
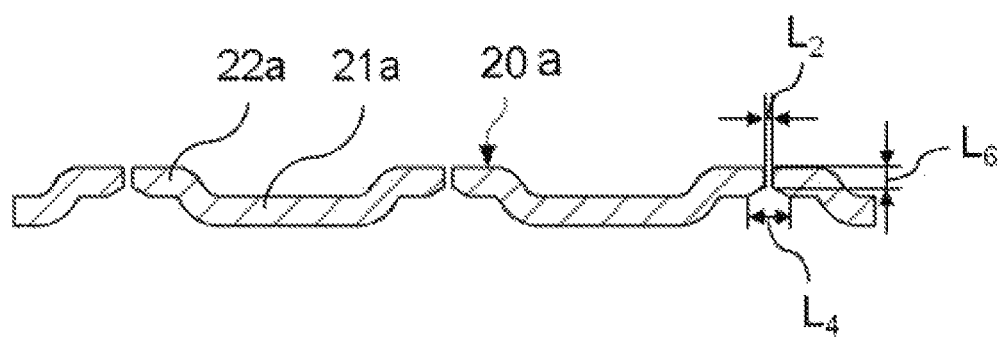
FIG. 4A is a cross-sectional view illustrating the bus bar according to an embodiment of the present disclosure.
Figure 4B:
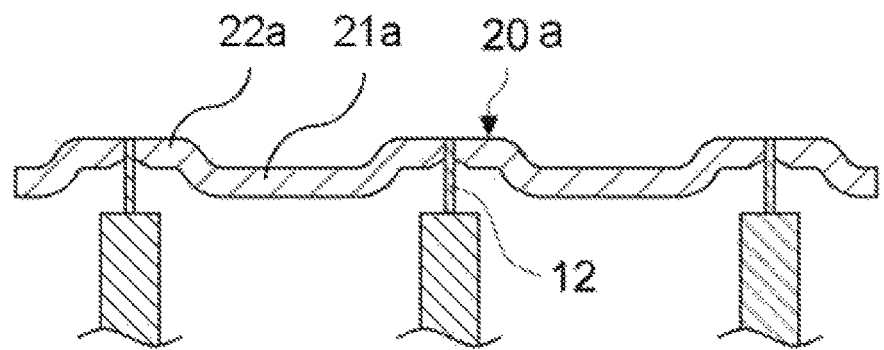
FIG. 4B is a cross-sectional view illustrating a state in which an electrode tab is inserted into a hole of the bus bar according to an embodiment of the present disclosure.

FIGS. 4A and 4B are views illustrating the bus bar 20a according to an embodiment of the present disclosure. FIG. 4A is a cross-sectional view illustrating the bus bar 20a, and FIG. 4B is a cross-sectional view illustrating a state in which the electrode tabs 12 are inserted into the holes 23a of the bus bar 20a.

Referring to FIGS. 4A and 4B, the holes 23a may be formed at the plate 21a at predetermined intervals of the plate 21a. The electrode tabs 12 may be inserted into the holes 23a. The hole 23a may be formed to correspond to the thickness $T_1$ and the length $L_1$ of the electrode tab 12 so that the electrode tab 12 inserted into the hole 23a may be in contact with the plate 21a. In the exemplary embodiment of FIGS. 4A and 4B, three holes 23a may be formed in the plate 21a constituting one bus bar 20a. Thus, in this exemplary case, three battery cells 11 welded through the holes 23a may be electrically connected. However, the present disclosure is not limited thereto, and any suitable number of holes 23a may be formed according to the number of batter cells 11 to be connected.

Each hole 23a may be formed within a corresponding protruding portion 22a as illustrated in FIGS. 4A and 4B. Having the protruding portions 22a is advantageous for more easily guiding and inserting the tabs 12 into their corresponding holes 23a. However, in embodiment of the present disclosure, the plate may not have any protruding portions, e.g., the plate may be substantially flat and may only have holes 23a configured to receive the corresponding tabs 12. Referring again to the embodiment of FIGS. 4A and 4B, each hole 23a may have a wider entry part starting with a wider width $L_4$ at one side of the plate 21a and a narrower width $L_2$ at some depth inside the plate 21a. Because of this shape of the entry part of the hole 23a, the electrode tab 12 can be more easily inserted into the narrower part of the hole 23a, which has a width $L_2$. The entry part of each hole 23a may also facilitate the precise positioning of the bus bar 20a so that the corresponding tabs 12 may be readily inserted into the holes 23a prior to the welding step.

Figure 5A:
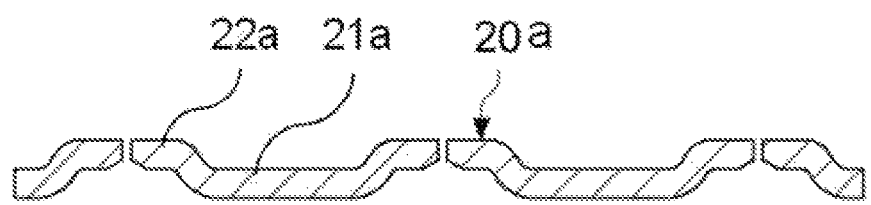
FIG. 5A is a cross-sectional view illustrating the bus bar according to an embodiment of the present disclosure.
Figure 5B:
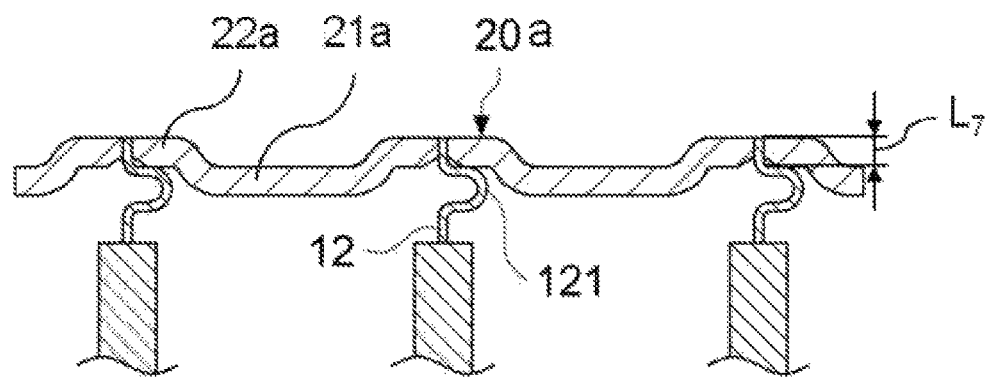
FIG. 5B is a cross-sectional view illustrating a state in which an electrode tab is inserted into a hole of a bus bar according to an embodiment of the present disclosure.

FIGS. 5A and 5B are views illustrating the bus bar 20a according to an embodiment of the present disclosure. FIG. 5A is a cross-sectional view of the bus bar 20a and FIG. 5B is a cross-sectional view illustrating a state in which the electrode tabs are inserted into the holes 23a of the bus bar 20a.

Referring to FIGS. 5A and 5B, each electrode tab 12 may include a bent portion 121. In this illustrated embodiment of FIGS. 5A and 5B, the bent portion 121 may have a U shape. The bent portion 121 may be formed by a predetermined portion of the electrode tab 12 being bent. However, the present disclosure is not limited thereto. That is, in a variation of the illustrated embodiment, a protruding portion may be formed on the predetermined portion of the electrode tab 12 and other bent portions 121 may be formed. When external vibration or impact occurs in a state in which the electrode tabs 12 are coupled to the bus bar 20a by welding, the bent portions 121 may absorb the impact at least partially, and thus reduce or prevent any damage to the coupling between the electrode tab 12 and the bus bar 20a and any damage to the electrode tabs 12.

Furthermore, when the electrode tabs 12 are inserted into the bus bar 20a, the bus bar 20a may be mounted and fixed on the bent portion 121 of the electrode tab 12, a gap $L_3$ (illustrated in FIG. 15) between the electrode tab 12, which is in an inserted state that will be described below, and the hole 23a of the bus bar 20a may be constantly maintained, a position of the electrode tab 12 inserted into the hole 23a may be fixed, and thus a welding line may be easily traced when the electrode tab 12 is welded later. In addition, the bent portion 121 may be brought into close contact with the one side of the plate 21a to prevent a laser L (illustrated in FIG. 17) from being directly applied to the battery cell 11 during the welding process.

Figure 10:
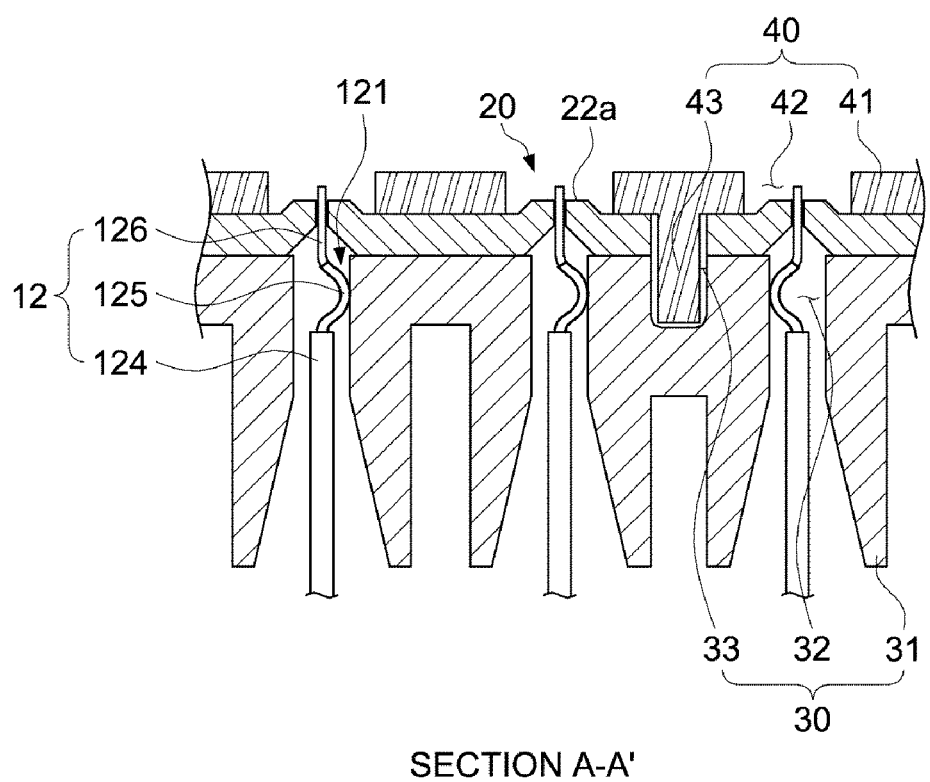
FIG. 10 is a cross-sectional view taken along line A-A' of FIG. 9.

Meanwhile, the position of the bent portion 121 is not limited thereto, and the bent portion 121 may be spaced at a predetermined distance from the hole 23a, as illustrated in FIG. 10, as will be described below in more detail. That is, the bent portion 121 may be positioned to be in contact with one side of an outer circumferential surface of a support hole 32 of a support plate 30 while being spaced apart from the hole 23a. A detailed description thereof will be given below.

Meanwhile, at least one electrode tab 12 may include the bent portion 121 and a straight portion, and at least a part of the straight portion may be inserted into its respective hole 23a. The straight portion may mean an unbent portion of the electrode tab 12. Also, the straight portion may mean a straight part of the electrode tab 12 without bending additionally although the straight portion may include some fine curve during the process.

Meanwhile, the predetermined portion may be a portion between a portion inserted into the hole 23a and a portion of the battery cell 11 at which the electrode tab 12 is drawn. As described above, a length $L_7$ of an unbent portion of an outside of the bent portion 121 of the electrode tab 12, when the electrode tab 12 is inserted into the hole 23a, may be defined by the bent portion 121 formed at the predetermined portion of the electrode tab 12.

The electrode tab 12 may be inserted into the hole 23a and fixed by the bent portion 121. The length $L_7$ of the unbent portion of the outside of the bent portion 121 of the electrode tab 12 may be adjusted by the bent portion 121 according to a position at which the bent portion 121 is formed at the electrode tab 12. Referring to the process of inserting the electrode tab 12 in the hole 23a, while the electrode tab 12 is inserted into the holes 23a, the bent portion 121 formed on the electrode tab 12 may be brought into contact with the plate 21a and locked. Therefore, the electrode tab 12 may be inserted into the hole 23a just above a position of the electrode tab 12 at which the bent portion 121 is formed and fixed. Meanwhile, the above-described length $L_7$ of the unbent portion of the outside of the bent portion 121 of the electrode tab 12 may be greater than the depth $L_6$ of the hole 23a.

In the bus bar 20a according to the embodiment of the present disclosure, in order to firmly weld the hole 23a formed in the bus bar 20a and the electrode tab 12 inserted into the hole 23a, a gap $L_3$ (that is, any one of gaps at both sides of the electrode tab 12 inserted into the hole 23a) between the hole 23a and the electrode tab 12 may have a predetermined size or less, and the predetermined size may be 0.2 mm. When the gap $L_3$ between the hole 23a and the electrode tab is more than 0.2 mm, it may be difficult to connect the hole 23a and the electrode tab 12 by laser welding. More preferably, the gap $L_3$ between the hole 23a and the electrode tab 12 may be 0.1 mm or less. For example, when the width $L_2$ of the hole 23a formed in the bus bar 20a is 0.5 mm, the thickness $T_1$ of the electrode tab 12 is set to 0.3 mm or more, and thus each of gaps $L_3$ between the holes 23a formed at both sides of the electrode tab 12 and both sides of the electrode tab 12 may be 0.1 mm ((0.5−0.3)/2) or less.

The bus bar 20a may also melt during the welding process, and there may be insufficient insertion in the process of inserting the electrode tab 12 when there is no difference between the thickness $T_1$ of the electrode tab 12 and the size of each of the holes 23a. Thus, each of the gaps $L_3$ between the hole 23a and both sides of the electrode tab 12 inserted therein should be about 0.05 (0.1/2) mm or more. That is, a sum of the gaps $L_3$ between the hole 23a and both sides of the electrode tab 12 inserted into the hole 23a may range from 0.1 mm to 0.2 mm.

Accordingly, only the electrode tab 12 may melt during laser welding in a process of manufacturing the battery module 1 that will be described below.

Meanwhile, the electrode tab 12 may be formed of any one of copper (Cu) and aluminum (Al). For example, when a positive electrode tab is made of copper (Cu), a negative electrode tab may be made of aluminum (Al), and vice versa. In this case, thicknesses $T_1$ of the positive electrode tab and the negative electrode tab may also vary. When the electrode tab is made of copper (Cu) due to characteristics of the positive electrode and the negative electrode tab, the thickness $T_1$ of the electrode tab may be about 0.3 mm, and when the electrode tab is made of aluminum (Al), the thickness $T_1$ of the electrode tab may preferably be about 0.4 mm. Therefore, the width $L_2$ of the hole 23a of the bus bar 20a may be about 0.5 mm. However, the thickness $T_1$ of the electrode tab 12 and the width $L_2$ of the hole 23a are not limited thereto, and it should be obvious that the thickness $T_1$ of the electrode tab 12 and the width $L_2$ of the hole 23a may be changed as necessary.

Figure 6:
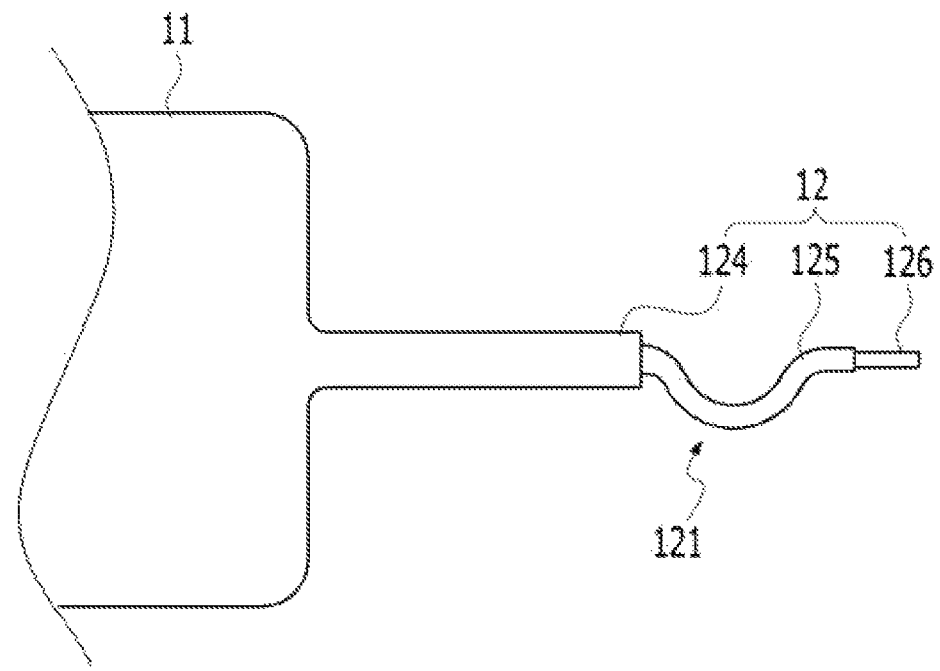
FIG. 6 is a view illustrating a state in which a bent portion is formed on an insulating portion of the electrode tab.

FIG. 6 is a view illustrating a state in which a bent portion 121 is formed on an insulating portion 125 of the electrode tab 12.

Referring to FIG. 6, the battery cell 11 may include an electrode assembly and an exterior material configured to surround the electrode assembly. In this case, the electrode tab 12 may include a terrace portion 124 formed by an exterior material being bonded along a side edge of the electrode assembly in which the electrode tab 12 protrudes, an insulating portion 125 that can increase a degree of sealing of the exterior material at a position at which the electrode tab 12 is drawn from the terrace portion 124 with securing an electrically insulated state, and an electrode tab portion 126 that is drawn from the insulating portion 125 and having at least a portion thereof inserted into the hole 23a being bound. The bent portion 121 may be formed on the insulating portion 125.

Specifically, the bent portion 121 may be formed by the electrode tab portion 126 being bent outside the insulating portion 125, but the present disclosure is not limited thereto, and the bent portion 121 may be formed on the insulating portion 125 by the insulating portion 125 of the electrode tab 12 being bent. As described above, as the bent portion 121 is formed on the insulating portion 125, an overall length $L_1$ of the electrode tab 12 may be reduced, reducing the overall volume of the battery module 1.

Furthermore, when the bent portion 121 is formed on the insulating portion 125, bending may be performed within a range in which the insulating material of the insulating portion 125 is not torn or damaged, and thus a volume occupied by the electrode tab 12 in the battery module 1 may be reduced while insulation performance of the insulation portion 125 is maintained, and an energy density of the battery module 1 may also be increased.

Figure 7A:
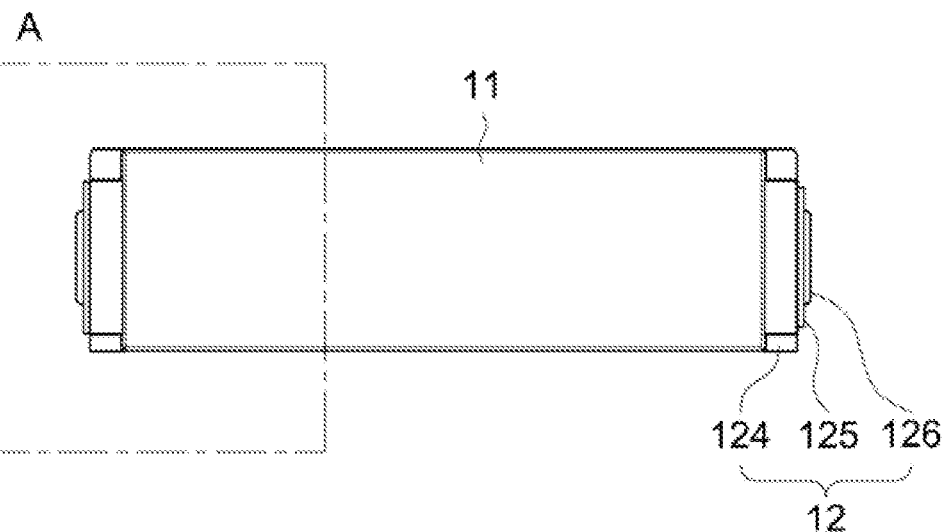
FIG. 7A is a view illustrating a secondary battery according to an embodiment of the present disclosure.
Figure 7B:
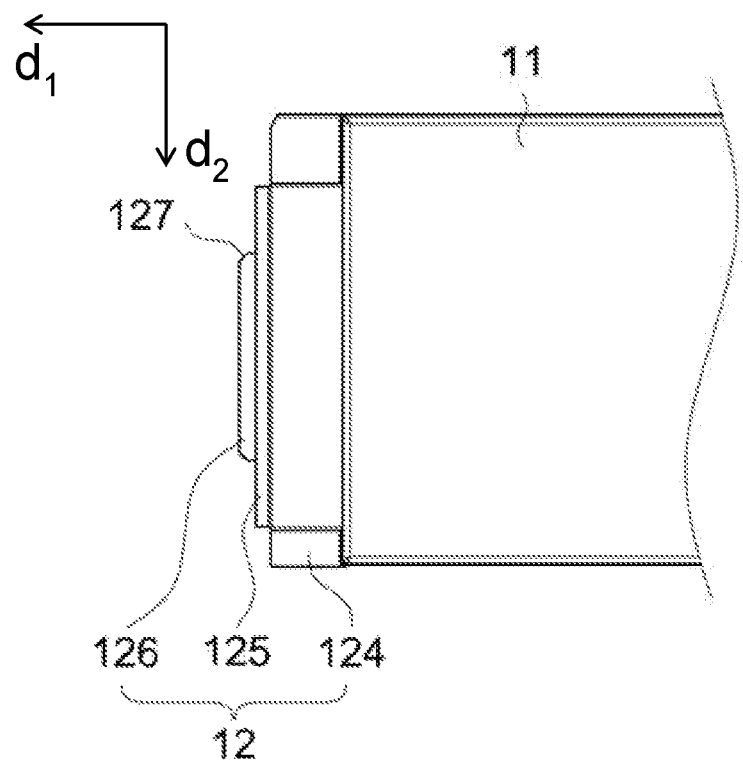
FIG. 7B is an enlarged view of a portion A of FIG. 7A.

FIG. 7A is a view illustrating a secondary battery according to an embodiment of the present disclosure, and FIG. 7B is an enlarged view of a portion A of FIG. 7A.

Meanwhile, referring to FIGS. 7A and 7B, chamfer portions 127 may be formed at both side ends of the electrode tab 12 so that the electrode tab 12 may be easily inserted into the hole 23a when the electrode tab 12 is inserted into the hole 23a.

Specifically, both side edges of the electrode tab 12 in a direction $d_2$ of the length $L_5$ of the end surface of the electrode tab 12 may be cut obliquely with respect to a direction $d_1$ of the length $L_1$ of the electrode tab 12, and the chamfer portions 127 may be formed on both of the side ends of the electrode tab 12. Since the chamfer portions 127 are formed at the ends of the electrode tab 12 as described above, insertion of the electrode tab 12 into the hole 23a may be induced in a process of inserting the electrode tab 12 into the hole 23a, and the insertion of the electrode tab 12 may be facilitated.

Figure 8:
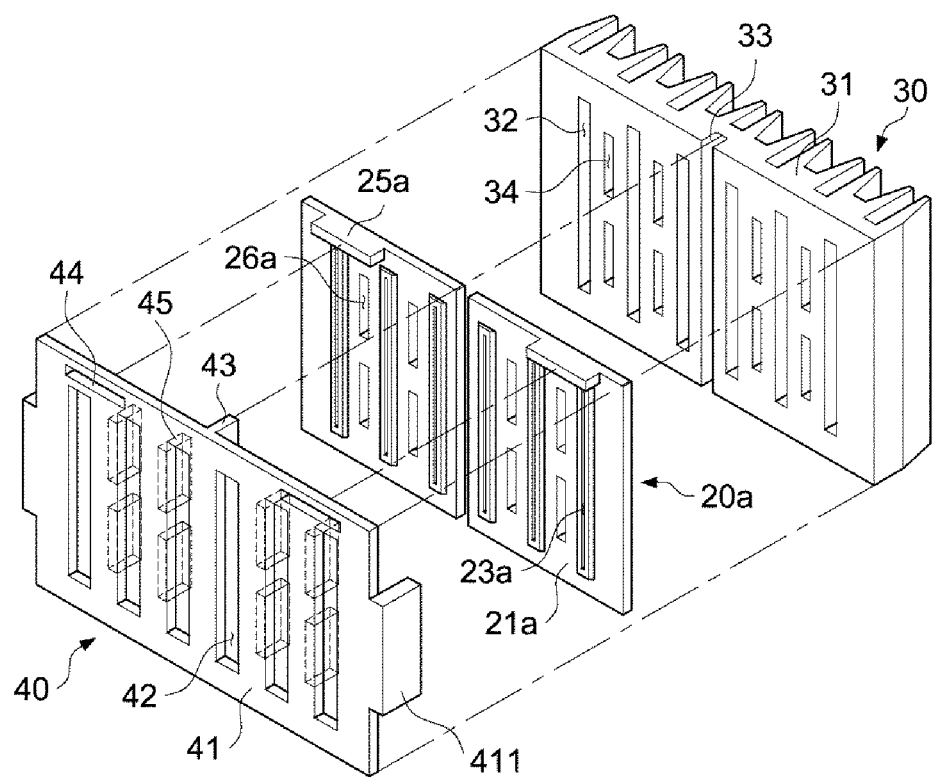
FIG. 8 is a perspective view illustrating a support plate, a bus bar, and a fixing plate according to an embodiment of the present disclosure.
Figure 9:
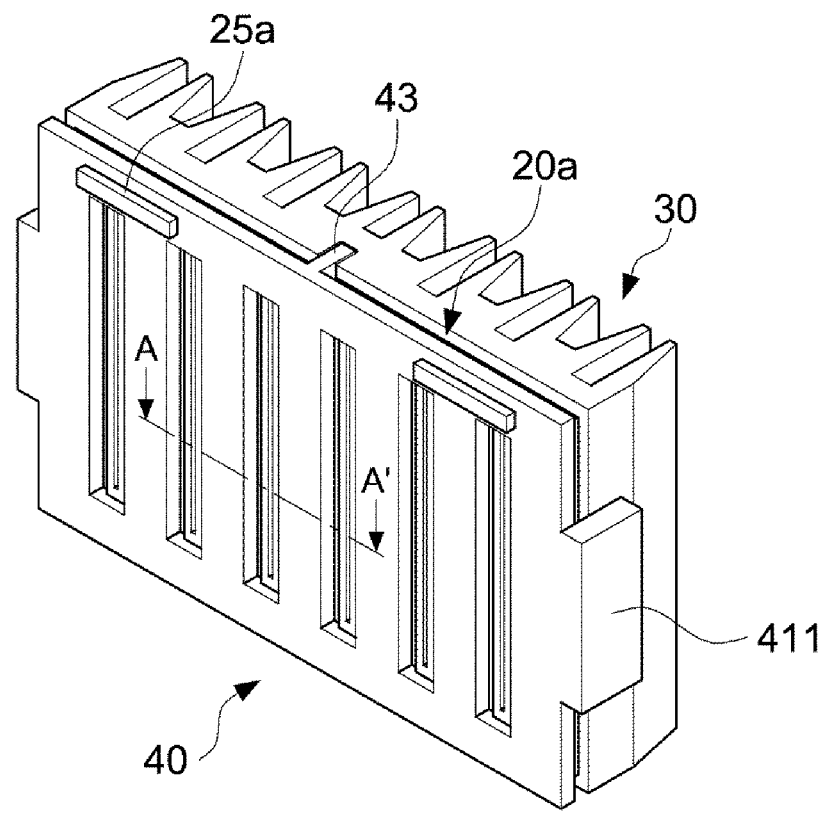
FIG. 9 is a view illustrating a state in which the support plate, the bus bar, and the fixing plate of FIG. 8 are coupled.

FIG. 8 is a perspective view illustrating a support plate 30, a bus bar 20a, and a fixing plate 40 according to an embodiment of the present disclosure. FIG. 9 is a view illustrating a state in which the support plate 30, the bus bar 20a, and the fixing plate 40 of FIG. 8 are coupled. FIG. 10 is a cross-sectional view taken along line A-A' of FIG. 9.

FIG. 9 is a view illustrating a state in which a plurality of secondary batteries 10 are not connected to an assembly of the support plate 30, the bus bar 20a, and a fixing plate 40, and FIG. 10 is a view illustrating a state in which the electrode tab 12 is inserted into one side of the assembly of the support plate 30, the bus bar 20a, and the fixing plate 40. Referring to FIGS. 8 to 10, the battery module 1 according to an embodiment of the present disclosure may further include the support plate 30 in which a plurality of support holes 32 corresponding to the holes 23a of the bus bar 20a are formed. In this case, the support plate 30 may be located between the plurality of battery cells 11 and the bus bar 20a to fixedly support the bus bar 20a.

Specifically, the support plate 30 may include a plate-shaped support plate body 31 and a plurality of support holes 32 that are formed on the support plate body 31 to correspond to the plurality of holes 23a of the bus bar 20a. In this case, a size of a cross-section of the support hole 32 may be greater than a size of a cross-section of the hole 23a of the bus bar 20a, and the bent portion 121 of the electrode tab 12 may be brought into contact with one side of an outer circumferential surface of the support hole 32 and supported thereby. In this case, the bent portion 121 may be formed on the insulating portion 125 of the electrode tab 12 as described above.

Accordingly, in a welding process that will be described below, the gap $L_3$ between the electrode tab 12 and the hole 23a of the bus bar 20a may be constantly maintained and a position of the electrode tab 12 inserted into the hole 23a may be fixed, and thus a welding line may be easily traced when the electrode tab 12 is welded later. In addition, the bent portion 121 may be brought into close contact with one side of an outer circumferential surface of a support hole 32 to prevent the laser L from being directly applied to the battery cell 11.

Meanwhile, as an outer surface of the support plate may be coated with an insulating material or the support plate may be formed of an insulating material and the plurality of electrode tabs may be respectively inserted into the plurality of support holes, an insulated state between the electrode tabs may be maintained.

Furthermore, the battery module 1 according to an embodiment of the present disclosure may further include the fixing plate 40, which couples and fixedly supports the bus bar 20a and the support plate 30.

Specifically, the battery module 1 according to an embodiment of the present disclosure may further include the fixing plate 40 in which a plurality of bus bar exposure holes 42 are formed to correspond to the holes 23a of the bus bar 20a. In this case, the fixing plate 40 may be located at an outer side of the bus bar 20a, and may fixedly support the bus bar 20a by being coupled to at least a portion of the support plate 30 on at least a portion of the fixing plate 40. Further, the fixing plate 40 may be positioned to cover an outer surface of the bus bar 20a, and thus may protect the bus bar 20a from foreign matter or the like.

More particularly, the fixing plate 40 may include a plate-shaped fixing plate body 41 and the plurality of bus bar exposure holes 42 formed in the fixing plate body 41 to correspond to the plurality of holes 23a of the bus bar 20a. In this case, a size of a cross-section of the bus bar exposure hole 42 may be greater than the size of the cross-section of the hole 23a of the bus bar 20a. Preferably, the bus bar exposure hole 42 may be formed to have a size such that the protruding portion 22a may be exposed to the outside, and thus a welding portion may be easily traced during welding.

Furthermore, the fixing plate 40 may be formed in a form in which a portion other than the bus bar exposure holes 42 surrounds an outer surface of the plate 21a of the bus bar 20a, and may be coupled to the support plate 30 with the bus bar 20a interposed therebetween to stably and fixedly support the bus bar 20a.

Figure 11A:
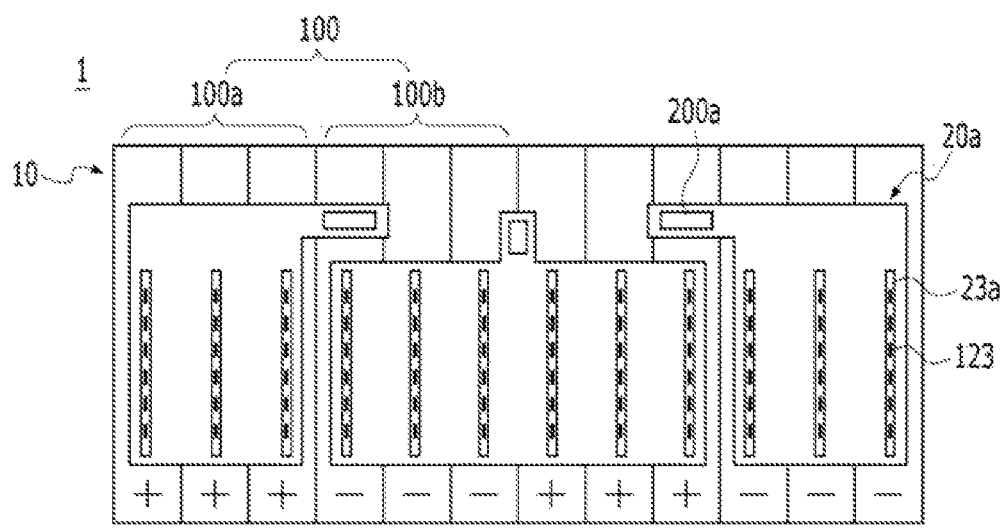
FIG. 11A is a front view illustrating an electrical connection state of a battery module according to an embodiment of the present disclosure.
Figure 11B:
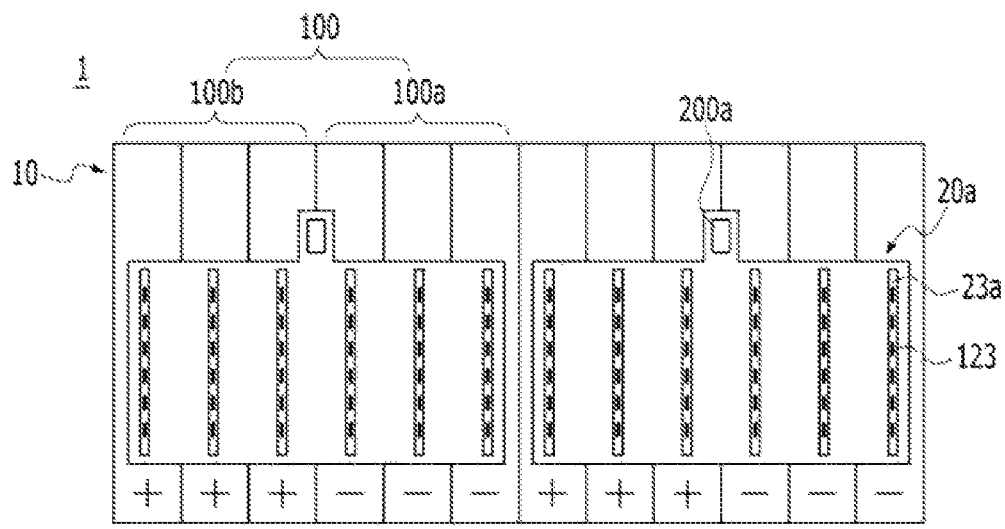
FIG. 11B is a rear view illustrating an electrical connection state of the battery module according to an embodiment of the present disclosure.

Meanwhile, referring to FIGS. 11A and 11B, two or more secondary batteries 10 may be connected in parallel through the bus bars 20a to be grouped into one parallel assembly 100, and a plurality of parallel assemblies 100 may be connected in series to form a battery module 1. In this case, two or more bus bars 20a may be provided, and a terminal portion 25a which can be connected to another external battery module or a charging and discharging device may be formed on at least a portion of each of the two bus bars 20a located at both ends of one side surface of the battery module 1.

Specifically, each of the terminal portions 25a may refer to a positive (+) pole or a negative (−) pole of the battery module 1 to which a plurality of parallel assemblies 100 are connected, and one of the two terminal portions 25a may be connected to the positive (+) pole and the other terminal portion may be connected to the negative (−) pole, according to an arrangement of electrodes of the plurality of parallel assembly 100.

Meanwhile, terminal support holes 44 may be formed at positions corresponding to the terminal portions 25a in at least a portion of both ends of the fixing plate 40, and the terminal portion 25a may be inserted and fixed to the terminal support hole 44.

For example, as illustrated in FIG. 8, two bus bars 20a each having three holes may be provided, and terminal portions 25a may be formed on at least a portion of each of the two bus bars 20a located at both ends of one side surface of the battery module 1. Furthermore, as illustrated in FIG. 9, a position of the bus bar 20a may be fixedly supported by the terminal portion 25a being inserted into the terminal support hole 44 formed on the fixing plate 40.

Furthermore, as the terminal portion 25a protrudes to an outside of the fixing plate 40, the terminal portion 25a may be exposed to the outside of the fixing plate 40 even while the bus bar 20a is surrounded by the fixing plate 40, and the terminal portion 25a may be connected to an external battery module, a charging and discharging device, or the like.

Meanwhile, when the plurality of bus bars 20a are provided as described above, at least one fixing member 43, which is located between the plurality of bus bars 20a and fixedly supports a position of the bus bar 20a, may be formed on at least a portion of the fixing plate 40. In this case, at least one fixing member 43 may protrude from at least a portion of the fixing plate body 41 toward the bus bar 20a. The number of fixing members 43 formed may correspond to the number of the bus bars 20a. For example, when two bus bars 20a are provided, as illustrated in FIG. 8, one fixing member may be formed at one side of the fixing plate 40, and the fixing member 43 may be positioned between the two bus bars 20a to fixedly support the positions of the bus bars 20a.

Furthermore, a fixing member insertion groove 33 corresponding to the fixing member 43 may be recessed in at least a portion of the support plate 30 at the bus bar 20a. Specifically, the fixing member 43 protruding from the fixing plate 40 may be inserted into one side of the support plate 30, and the fixing member 43 may be positioned in the fixing member insertion groove 33 so that the fixing member 43 may firmly and fixedly support the bus bar 20a.

Furthermore, the fixing plate 40 may include a plurality of fastening protrusions 411, which are formed by at least a portion of the fixing plate body 41 protruding toward the bus bar 20a, and the fastening protrusions 411 may be coupled to at least a portion of the support plate 30 so that the support plate 30 and the fixing plate 40 may be coupled to each other.

Specifically, a locking portion (not illustrated) may be formed at the fastening protrusion 411, a locking groove (not illustrated) corresponding to the locking portion may be formed on at least a portion of the support plate 30, and thus the fixing plate 40 and the support plate 30 may be engaged and coupled to the bus bar 20a interposed therebetween through the fastening of the locking portion and the locking groove. However, this configuration is merely an example, and the present disclosure is not limited thereto. That is, it is sufficient for the fastening protrusions 411 to be brought into contact with at least a portion of the support plate 30 to be fastened and coupled.

As described above, the fixing plate 40 may be formed to surround all of the remaining portions other than the protruding portion 22a of the bus bar 20a, and thus the possibility of electrical connection with other components around the bus bar 20a may be preemptively blocked when the battery module 1 is used.

Meanwhile, at least one insertion protrusion 45 protruding toward the bus bar 20a may be formed on a side surface of the fixing plate body 41 at the bus bar 20a. In this case, the bus bar 20a may further include at least one through-hole 26a, which is formed at a position corresponding to a position of the insertion protrusion 45 at the plate 21a and through which the insertion protrusion 45 passes. Further, the support plate 30 may be formed on the support plate body 31 so that the insertion protrusion 45 may be inserted therein, and the support plate 30 may further include at least one fastening hole 34, which may be coupled to the insertion protrusion 45 when the insertion protrusion 45 is inserted thereinto.

Specifically, the insertion protrusion 45, the through-hole 26a, and the fastening hole 34 may be formed at positions corresponding to positions of the fixing plate body 41, the plate 21a, and the support plate body 31, respectively. For example, the insertion protrusion 45 may be formed at a position adjacent to the bus bar exposure hole 42. Accordingly, the through-hole 26a may be formed at a position adjacent to the hole 23a, and the fastening hole 34 may be formed at a position adjacent to the support hole 32.

More particularly, when the fixing plate 40, the bus bar 20a, and the support plate 30 are coupled as illustrated in FIG. 9, the insertion protrusion 45 may be inserted into the fastening hole 34 of the support plate 30 through the through-hole 26a of the bus bar 20a. In this case, the insertion protrusion 45, which may be inserted into the fastening hole 34, and the fastening hole 34 may be coupled so that the support plate 30 and the fixing plate 40 may be coupled, and the position of the bus bar 20a may be fixed.

Further, the insertion protrusion 45 may be thermally fused while the insertion protrusion 45 is inserted into the fastening hole 34 through the through-hole 26a so that the insertion protrusion 45 may be attached to one surface of the support plate body 31, and accordingly, the fixing plate 40, the bus bar 20a, and the support plate 30 may be coupled so that the position of the bus bar 20a may be stably and fixedly supported.

Meanwhile, the support plate 30 and the fixing plate 40 may be formed to have a size corresponding to a cross-sectional area of a stacked structure of the plurality of battery cells 11 in a stacking direction. Accordingly, an unnecessary volume of the battery module 1 may be minimized despite the volume of the support plate 30 and the fixing plate 40, and thus the bus bar 20a and the electrode tabs 12 may be fixedly supported while energy density of the battery module 1 is not hindered.

FIGS. 11A and 11B are front and rear views, respectively, of a battery module 1 according to an embodiment of the present disclosure. A secondary battery at a left end of FIG. 11A is a secondary battery at a right end of FIG. 11B. The battery module 1 illustrated in FIGS. 11A and 11B is in an electrically connected state.

Referring to FIGS. 11A and 11B, two or more secondary batteries 10 may be connected in parallel through the bus bar 20a to be grouped into one parallel assembly 100, and a plurality of parallel assemblies 100 may be connected in series to form a battery module 1.

For example, as described in FIG. 11A, when viewed from the front, three positive (+) poles of the secondary batteries 10 may be connected in parallel through the bus bar 20a to form the one parallel assembly 100a, and the parallel assembly 100a may be arranged to be adjacent to a parallel assembly 100b in which negative (−) poles are connected in parallel and connected to the parallel assembly 100b in series.

Specifically, four parallel assemblies 100a and 100b having different electrodes may be provided on the basis of one direction of the plurality of secondary batteries 10 and may be connected in series through bus bars 20a. That is, a total of twelve secondary batteries 10 may be connected. However, this configuration is merely an example, and the present disclosure is not limited thereto. That is, two secondary batteries 10 having the same electrode may be connected in parallel to form one parallel assembly 100 and a plurality of parallel assemblies 100 having different electrodes at one side thereof may be connected in series to form one battery module 1.

As described above, in the battery module 1 according to an embodiment of the present disclosure, since the number of the secondary batteries 10 constituting one parallel assembly 100 may be freely selected and the number of the parallel assemblies 100 to be connected in series may also be freely selected, a degree of freedom in configuring the battery module 1 may be improved, which may be achieved by the number of the holes 23a formed in the bus bar 20a being simply changed.

Further, the bus bar 20a according to an embodiment of the present disclosure may further include a voltage sensing connection portion 200a formed on at least a portion of the plate 21a. Specifically, the voltage sensing connection portion 200a may be connected to a voltage sensing module (not illustrated) for measuring a voltage of the parallel assembly 100 and the like. In this case, the voltage sensing module may be a configuration, such as a voltage sensing circuit, a battery management module, or the like located outside the battery module 1 and capable of measuring and confirming a state of a voltage of the parallel assembly 100.

Meanwhile, in a welding process of the electrode tab 12 that will be described below, a laser may be applied to an end surface of the electrode tab 12 at predetermined intervals to the end surface of the electrode tab 12 so that a plurality of electrode tab welding portions 123 may be formed at the predetermined intervals. See FIG. 16A. However, the present disclosure is not limited thereto, and, as illustrated in FIG. 16B that will be described below, the laser may be continuously applied to the end surface of the electrode tab 12 so that the electrode tab welding portion 123 may be formed to have a continuous shape in a straight line.

Further, although the terminal portion 25a is not included in the bus bar 20a illustrated in FIGS. 11A and 11B, FIGS. 11A and 11B are views for describing an electrical connection relationship between the plurality of secondary batteries 10 except that the terminal portion 25a is omitted, and the terminal portion 25a may protrude from at least a portion of the bus bars 20a at both ends of the plurality of bus bar 20a.

Figure 12A:
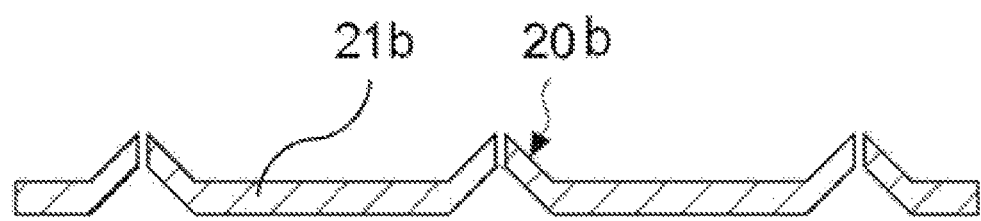
FIG. 12A is a cross-sectional view illustrating a bus bar according to an embodiment of the present disclosure.
Figure 12B:
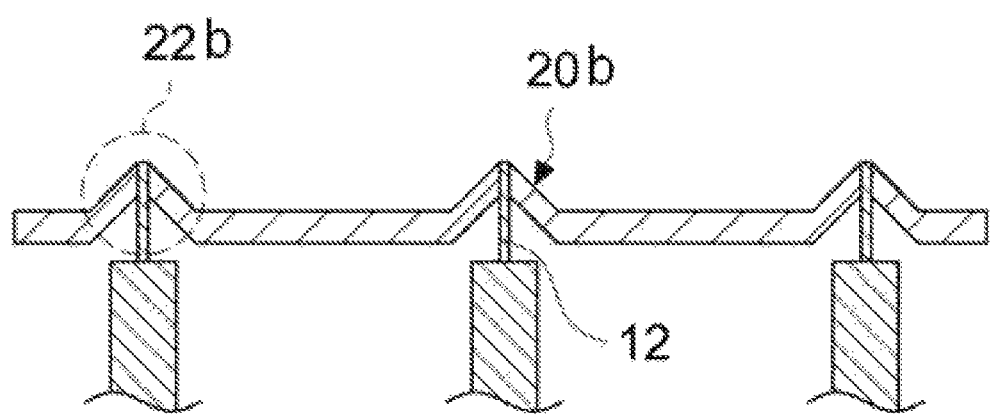
FIG. 12B is cross-sectional view illustrating a state in which an electrode tab is inserted into a hole of the bus bar according to an embodiment of the present disclosure.

FIGS. 12A and 12B are cross-sectional views illustrating a bus bar 20b according to an embodiment of the present disclosure. FIG. 12A is a cross-sectional view illustrating the bus bar 20b, and FIG. 12B is a cross-sectional view illustrating a state in which an electrode tab 12 is inserted into a hole 23b of the bus bar 20b.

A protruding portion 22b of a bus bar 20b according to an embodiment of the present disclosure may include a tapered cross-section shape. The protruding portion 22b may be formed to have a conical cross-section with the hole 23b positioned at the top of the conical cross-section. Hence, the sides of the protruding portion 22b may be formed to be inclined surfaces. The protruding portion 22b may be formed to have a shape such that a cross-section of an inner space of the protruding portion 22b is reduced near the hole 23b. The protruding portion 22b may function to induce the electrode tab 12 to be inserted into the hole 23b due to an inclination thereof when the electrode tab 12 is inserted into the hole 23b.

Figure 13A:
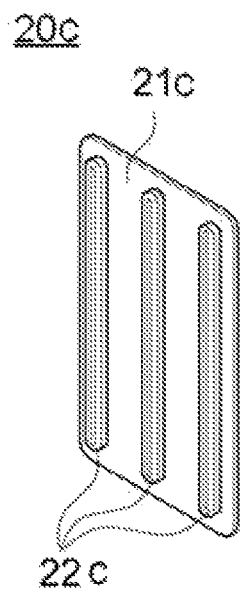
FIGS. 13A and 13B are views illustrating the bus bar according to an embodiment of the present disclosure.
Figure 13B:
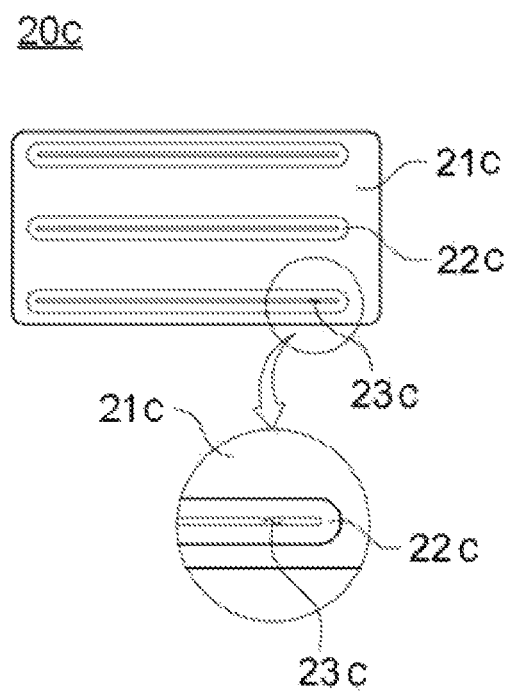

FIGS. 13A and 13B are cross-sectional views illustrating a bus bar 20c according to an embodiment of the present disclosure.

Referring to FIGS. 13A and 13B, a bus bar 20c according to an embodiment of the present disclosure may include a plate 21c and a plurality of holes 23c. The bus bar 20c may include a plurality of holes 23c, which are formed in the plate 21c at predetermined intervals. A size, such as an area or the like, of the plate 21c and the positioning of the holes 23c may correspond to the number and width of the battery cells 11 and the positioning of the electrode tabs 12. Since a detailed description thereof is identical to that of the bus bar 20a according to an embodiment of the present disclosure above, overlapping descriptions will be omitted.

In this case, the plate 21c may include protruding portions 22c, which are also referred to as tab connection portions 22c. Each of the tab connection portions 22c may protrude from an outer periphery of each of the holes 23c in a direction in which the electrode tab 12 protrudes, and the electrode tab 12 melted by the laser L may then be brought into contact with the tab connection portion 22c and electrically connected to the bus bar 20c when the battery cells 11 are electrically connected by laser welding. The sides of each tab connection portion 22c are substantially perpendicular to the plate 21c. Hence, unlike the embodiment of FIGS. 12A and 12B wherein the sides of each protruding portion is an inclined surface, in the embodiment of FIGS. 14A and 14B, the sides are substantially perpendicular to the plate 21c.

Since the tab connection portion 22c is formed on the plate 21c, reflected light of the laser L may be minimized when the laser L is applied for electrical connection between the battery cells 11. Accordingly, dispersion of energy of the laser L may be prevented and the laser L having a specific amount of energy may be uniformly applied during welding. Thus a process error in the welding process may be reduced and a production speed of a battery module 1 may be improved.

Figure 14A:
FIG. 14A is a cross-sectional view illustrating the bus bar according to an embodiment of the present disclosure.
Figure 14B:
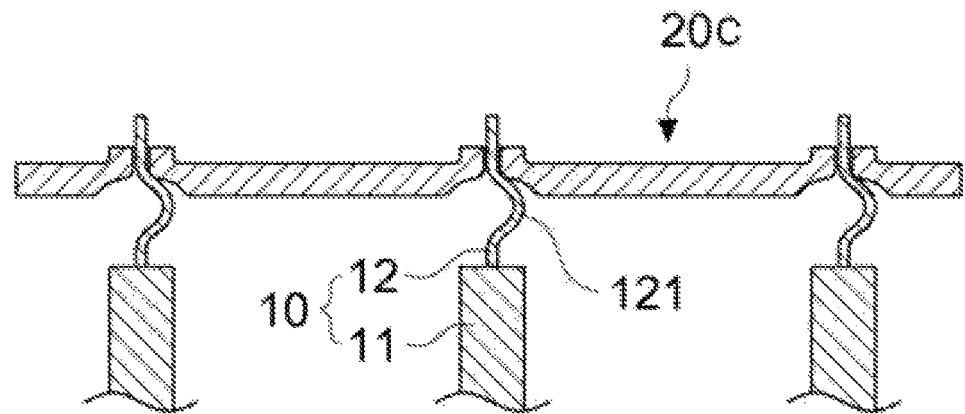
FIG. 14B is a cross-sectional view illustrating a state in which the electrode tab is inserted into the hole of the bus bar according to an embodiment of the present disclosure.

FIG. 14A is a cross-sectional view illustrating the bus bar 20c according to an embodiment of the present disclosure, and FIG. 14B is a cross-sectional view illustrating a state in which the electrode tab 12 is inserted into the hole 23c of the bus bar 20c.

Referring to FIG. 14B, the battery cell 11 may be arranged to be perpendicular to the ground, and the bus bar 20c may be mounted on the electrode tab 12 at an outer side of the battery cell 11. It should be apparent to those skilled in the art that the present disclosure is described with reference to drawings in which the battery cells 11 may be arranged in parallel to the ground, and thus a position of the bus bar 20c may be changed.

Referring to FIGS. 14A and 14B, the hole 23c may be formed to have a depth $L_6$ relatively smaller to a length $L_1$ of the electrode tab 12, so that the electrode tab 12, when it is inserted into one side of the bus bar 20c, may protrude from the other side of the bus bar 20c. For example, the electrode tab 12 may preferably protrude by about 1 mm or more from an outer end of the tab connection portion 22c so that the laser L is applied to the electrode tab 12 obliquely with respect to a central axis of a direction $d_1$ of the length $L_1$ of the electrode tab 12. Further, the bus bar 20c may be welded by applying only the electrode tab 12 without applying the bus bar 20c in a welding process that will be described below. On the other hand, when the electrode tab 12 protrudes too much, the laser L should be repeatedly applied to the electrode tab 12. Also, if the electrode tab 12 is not sufficiently melted during the welding, the electrode tab 12 and the bus bar 20c may not be smoothly connected. Therefore, the electrode tab 12 preferably protrudes by about 3 mm or less.

Further, a bent portion 121 may be formed on the electrode tab 12. In this case, the bent portion 121 may be formed by a predetermined portion of the electrode tab 12 being bent. The bent portion 121 is not limited to being formed by the predetermined portion of the electrode tab 12 being bent, and a protruded portion may be formed at the predetermined portion of the electrode tab 12.

In this case, since a detailed description of the bent portion 121 is identical to that of the above-described electrode tab 12 according to an embodiment of the present disclosure, the overlapping descriptions will be omitted.

Meanwhile, since a connection structure of the bent portion 121 of the electrode tab 12 and the support plate 30, the fixing plate 40, and the parallel assembly 100 described in the specification is identical to that of each of the battery modules 1 according to various embodiments of the present disclosure above, overlapping descriptions thereof will be omitted.

According to an embodiment, a battery module 1 may be manufactured by stacking a plurality of battery cells 11, arranging an electrode tab 12 included in each of the plurality of battery cells 11 at one side of the plate 21c of the bus bar 20c adjacent a respective hole 23c among a plurality of holes 23c of the plate 21c, inserting the electrode tabs 12 in their corresponding holes 23c, and electrically connecting the plurality of battery cells 11.

In an embodiment, the plurality of battery cells 11 may be electrically connected by laser welding the electrodes 12 to the plate after the electrodes are positioned within their respective holes 23c. A laser L may be applied only to the electrode tabs 12 as described above. As described above, when a bus bar 20c is welded by applying the laser only on the electrode tab 12, the electrode tabs 12 and the bus bar 20a maybe coupled after the electrode tabs 12 melt sufficiently. Dislike a conventional method of melting and welding two base materials, problem of specific portions being connected while a portion is not welded as one of the two base materials is not melt sufficiently may be minimized. Thus a welding state may be visually checked, and quality and production speed of the battery module 1 may be significantly improved.

Furthermore, the welding may be performed on an end surface of the electrode tab 12 at regular intervals, the laser L may be repeatedly applied to the end surface in a shape of a circle, and centers of the circles may be located along an axis 122 of a direction $d_2$ of a length $L_5$ of the end surface of the electrode tab 12. As described above, the welded portion of the electrode tab 12 may be uniformly melted by wobble-type welding performed by the circles being repeatedly formed to overlap. Specifically, stability of a process of manufacturing the battery module 1 may be improved in the welding process of the electrode tab 12 included in the battery cell 11 which is vulnerable to high temperature.

Meanwhile, a support plate 30 may be arranged between the plurality of battery cells 11 and the bus bar 20c, and the electrode tab 12 may be positioned to pass through support holes 32 of the support plate 30. Specifically, the electrode tab 12 may be inserted at one side of the plate 21c while passing through the support holes 32 of the support plate 30, and thus may be arranged on at least a portion of the plurality of holes 23c.

In this case, the electrode tab 12 may include the bent portion 121 formed by being bent and folded, and the bent portion 121 may be brought into close contact with one side of an outer circumferential surface of the support hole 32 so that the electrode tab 12 may be fixedly supported.

Further, as illustrated in FIG. 10 described above, a fixing plate 40 may be arranged at the other side of the bus bar 20a, and the position of the bus bar 20a may be fixedly supported by coupling the fixing plate 40 and the support plate 30.

Specifically, a plurality of insertion protrusions 45, which are formed by forming at least a portion of the fixing plate body 41 to protrude, may be formed on side surfaces of the support plate 30 of the fixing plate 40, and a plurality of fastening holes 34 corresponding to the insertion protrusions 45 may be formed on at least a portion of a support plate body 31. In this case, as described above, the insertion protrusions 45 may be inserted in the fastening holes 34 and fused so that the fixing plate 40 and the support plate 30 may be coupled with the bus bar 20a interposed therebetween, and a position of the bus bar 20a may be fixedly supported.

Meanwhile, a hole 23a and a protruding portion 22a that will be described below may be exposed to the outside through a bus bar exposure hole 42 of the fixing plate 40, and thus an operator may easily trace a welding line when the electrode tab 12 and the bus bar 20a are welded.

Since detailed descriptions of the support plate 30 and the fixing plate 40 are identical to those of the battery module 1 according to an embodiment of the present disclosure described above, overlapping descriptions will be omitted.

Meanwhile, in the plate 21a of the bus bar 20a, the protruding portion 22a may be formed at a position at which the hole 23a is formed. Specifically, the protruding portion 22a may be formed to create an entry space having a width $L_4$ into which the electrode tab 12 enters at one side of the protruding portion 22a is reduced near the holes 23a, and the insertion of the electrode tab 12 may be facilitated when the above-described electrode tab 12 is inserted into the hole 23a of the plate 201a.

Furthermore, according to an embodiment of the present disclosure, the protruding portion 22b may be formed on the plate 21b of the bus bar 20b at a position at which the hole 23b is formed. Specifically, the protruding portion 22b may be formed to have a cross-section shape tapered toward the hole 23b, and all of the holes 23b may be formed to have a tapered cross-section shape so that the insertion of the electrode tab 12 into the hole 23b may be facilitated during the insertion of the electrode tab 12 into the hole 23b.

Figure 15:
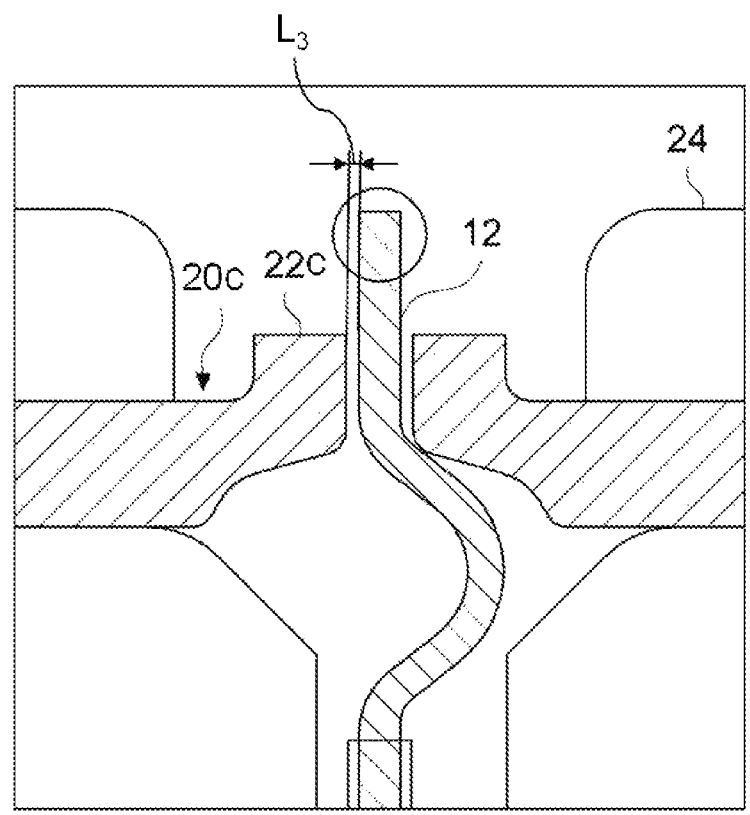
FIG. 15 is a cross-sectional view illustrating a position at which laser welding is performed on a protruding electrode tab according to an embodiment of the present disclosure.

FIG. 15 is a cross-sectional view illustrating a position at which laser welding is performed on a protruding electrode tab 12 according to an embodiment of the present disclosure.

Referring to FIG. 15, the battery module 1 may be manufactured by stacking a plurality of battery cells 11, inserting the electrode tab 12 included in each of the plurality of battery cells 11 into one side of the plate 21c in which the plurality of holes 23c are formed and arranging the electrode tab 12 to protrude toward the other side of the plate 21c in at least a portion of the plurality of holes 23c, and electrically connecting the plurality of battery cells 11.

Further, the battery module 1 may further include a bus bar assistance member 24 formed of an insulating material such as plastic or the like. The bus bar assistance member 24 may be formed to surround all of the remaining portions other than the tab connection portion 22c, and thus the possibility of electrical connection with other components around the bus bar 20c may be preemptively blocked when the battery module 1 is used.

Further, the electrode tab 12 may be inserted into one side of the plate 21c in which the plurality of holes 23c are formed to protrude from the other side of the plate 21c. In this case, the electrode tab 12 may be arranged to protrude by a length of 1 to 3 mm from an outer end of the hole 23c, as described above.

Meanwhile, the plurality of battery cells 11 may be electrically connected by laser welding, and the laser L may be applied only to the electrode tab 12, as described above. As described above, when the bus bar 20c is welded by only the electrode tab 12 being applied without applying the bus bar 20c, problem of specific portions being connected while a portion is not welded may be minimized in comparison to a conventional method of melting and welding two base materials. Thus a welding state may be visually checked, and quality and production speed of the battery module 1 may be significantly improved.

Figure 16A:
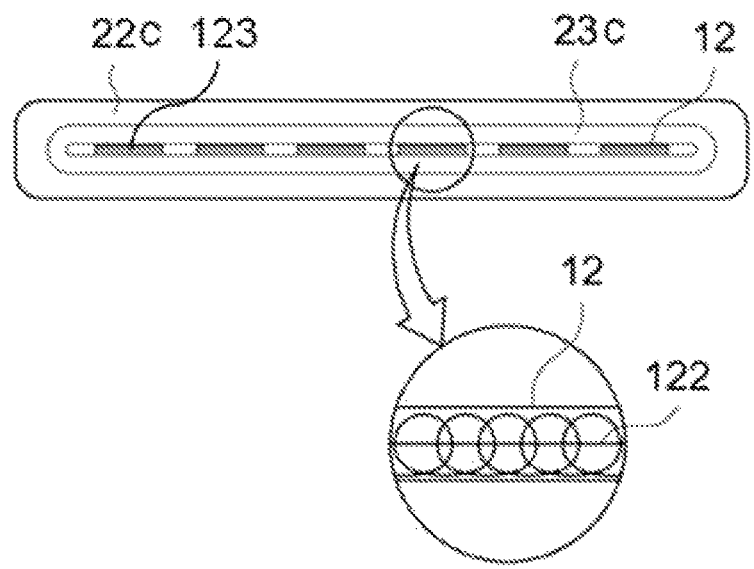
FIGS. 16A and 16B are views illustrating a state in which laser welding is performed on the electrode tab according to an embodiment of the present disclosure.
Figure 16B:
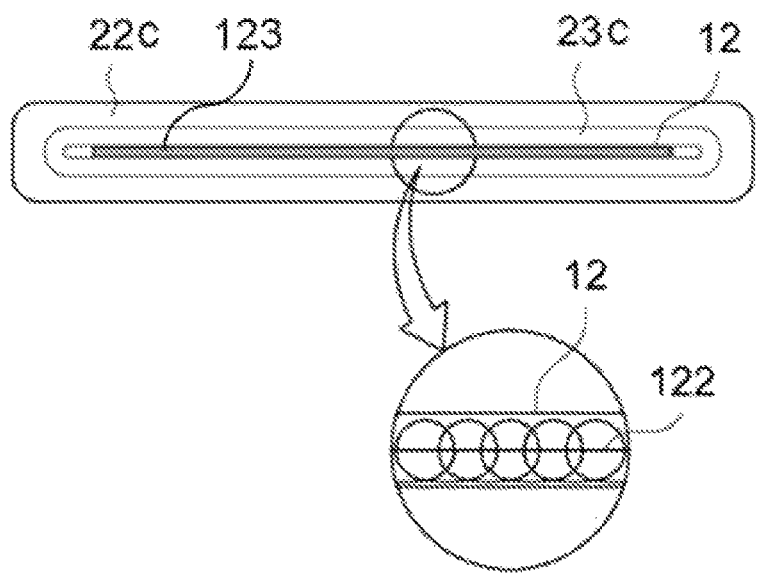

FIGS. 16A and 16B are views illustrating a state in which laser welding is performed on an electrode tab 12 according to an embodiment of the present disclosure.

Referring to FIGS. 16A and 16B, welding may be performed on an end surface of the electrode tab 12 at regular intervals. An enlarged view in FIGS. 16A and 16B illustrates that welding is not performed in a straight line like a conventional laser welding, and the laser L is repeatedly applied to the end surface of the electrode tab 12 in a shape of a circle, and centers of the circles are located along an axis 122 in a direction $d_2$ of the length $L_5$ of the end surface. As described above, the welded portion of the electrode tab 12 may be uniformly melted through wobble-type welding performed by the circles being repeatedly formed to overlap. Specifically, welding may be effectively applied, and stability of a process of manufacturing the battery module 1 may be improved in a welding process of the electrode tab 12 included in the battery cell 11 which is vulnerable to high temperature.

Meanwhile, it is noted that the welding is not limited to being performed at regular intervals. As illustrated in FIG. 16B, the laser may be continuously applied to the end surface of the electrode tab 12 so that the electrode tab welding portion 123 may be formed to have a continuous shape in a straight line.

Figure 17A:
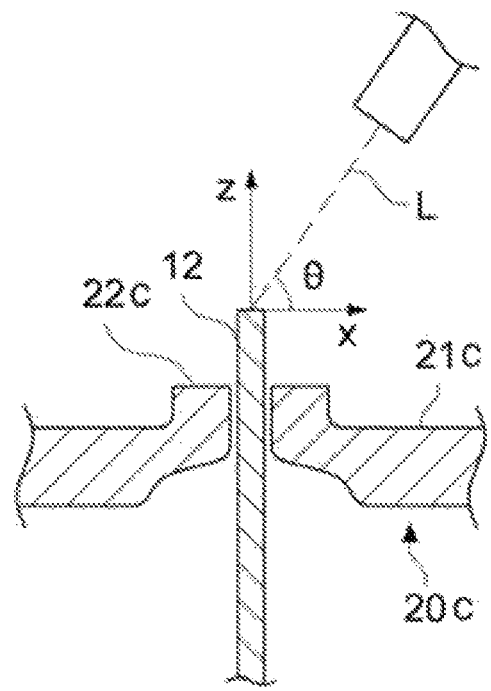
FIGS. 17A and 17B are views illustrating a state in which a laser is applied to the electrode tab at an angle with respect to a longitudinal direction of the electrode tab according to an embodiment of the present disclosure.
Figure 17B:
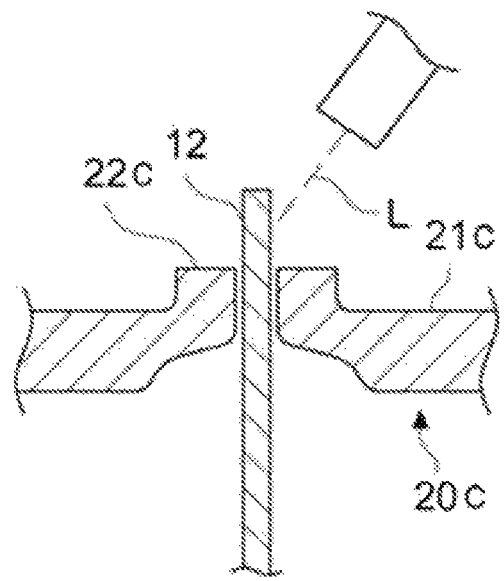

FIGS. 17A and 17B are views illustrating a state in which a laser is applied to the electrode tab 12 at an angle with respect to a direction $d_1$ of the length $L_1$ of the electrode tab 12 according to an embodiment of the present disclosure.

Referring to FIGS. 17A and 17B, the laser L may be applied obliquely with respect to a central axis of a direction $d_1$ of the length $L_1$ of the electrode tab 12 inserted into the hole and protruding therefrom. Accordingly, when the laser L is applied obliquely to the end surface of the electrode tab 12, it is possible to reduce errors and accidents by minimizing the possibility of the laser L being directly applied to the battery cell 11. As the laser L is obliquely applied, the welding process on the end surface of the electrode tab 12 may be visually confirmed, and thus quality and production speed of the battery module 1 may be improved. However, if necessary, the laser L may be applied perpendicularly to the end surface of the electrode tab 12.

Meanwhile, in this case, the laser L may be applied to the end surface of the electrode tab 12, as illustrated in FIG. 17A, but the present disclosure is not limited thereto, and the laser L may be applied to one side surface of the electrode tab 12 according to a material of the electrode tab 12, as illustrated in FIG. 17B. Furthermore, it should be apparent to those skilled in the art that the laser L may be applied around the bus bar 20c.

According to the present disclosure, a battery module is provided which allows the number of assembling processes to be reduced for electrically connecting a plurality of battery cells.

Further, a battery module capable of preventing deformation of shapes of electrode tabs due to a shape of a bus bar being deformed can be provided.

Further, a battery module of the present disclosure allows costs to be reduced since the number of processes may be reduced.

Further, when a plurality of battery cells are electrically connected, electrode tabs can be uniformly melted.

Further, when a plurality of battery cells are electrically connected by welding or the like, a connection state can be visually confirmed.

While representative embodiments of the preset disclosure have been described above in detail, those skilled in the art should understand that the embodiments may be variously modified without departing from the scope of the present disclosure as defined in the appended claims.

What is claimed is:
1. A battery module comprising:
a plurality of battery cells each including at least one electrode tab; and
a bus bar connected to the electrode tabs to electrically connect the plurality of battery cells to each other, the bus bar having a plate in which a plurality of holes are formed;
wherein each of the electrode tabs is inserted into a corresponding one of the plurality of holes and bonded as wobble shape to the corresponding one of the plurality of holes,
wherein the plurality of battery cells are stacked in a front-rear direction,
wherein each of the electrode tabs includes a bending portion, wherein a front surface of the bending portion faces forward, wherein a rear surface of the bending portion faces rearward, and wherein one of the front surface and the rear surface is convex and another of the front surface and the rear surface is concave.

2. The battery module of claim 1, wherein the electrode tabs are inserted into one side of the plate and protrude from the other side of the plate.

3. The battery module of claim 2, wherein each of the electrode tabs protrudes by a length of 1 mm to 3 mm from an outer end of the corresponding one of the plurality of holes.

4. The battery module of claim 1, wherein the plate includes a plurality of protruding portions formed at a periphery of each of the plurality of holes.

5. The battery module of claim 4, wherein a cross-section of the periphery of each of the plurality of holes is formed to be tapered toward one side of the plate so that each of the electrode tabs is inserted into the corresponding one of the plurality of holes.

6. The battery module of claim 4, wherein a width of an entered space into which each of the electrode tabs enters at the one side of the plate is reduced near the corresponding one of the plurality of holes.

7. The battery module of claim 1, wherein the plate includes a tab connection portion configured to protrude from an outer periphery of each of the holes to an outside of the plate.

8. The battery module of claim 1, wherein the electrode tabs and the plate are connected by laser welding.

9. The battery module of claim 1, wherein each of the plurality of holes is formed to correspond to a thickness and a length of a corresponding one of the electrode tabs.

10. The battery module of claim 1, wherein a sum of gaps on both sides between one of the plurality of holes and one of the electrode tabs inserted into the one of the plurality of holes ranges from 0.1 mm to 0.2 mm.

11. The battery module of claim 1, wherein:
a plurality of bus bars are provided;
at least two of the plurality of electrode tabs are connected in parallel to any one of the plurality of bus bars to form a parallel assembly; and
a plurality of the parallel assemblies are provided and connected in series or in parallel.

12. The battery module of claim 1, wherein the electrode tabs respectively further include:

a straight portion extending from the bending portion, the straight portion being inserted into a corresponding one of the plurality of holes and bonded at the corresponding one of the plurality of holes to the bus bar.

13. The battery module of claim 1, wherein:
the electrode tabs respectively include an insulating portion formed on at least a portion of the electrode tabs; and
the bending portion formed on the insulating portion.

14. A battery module comprising:
a plurality of battery cells each including at least one electrode tab;
a bus bar connected to the electrode tabs to electrically connect the plurality of battery cells to each other, the bus bar having a plate in which a plurality of holes are formed; and
a support plate positioned between the plurality of battery cells and the bus bar;
wherein each of the electrode tabs is inserted into a corresponding one of the plurality of holes and bonded as wobble shape to the corresponding one of the plurality of holes,
wherein the support plate includes a plurality of support holes corresponding to the plurality of holes of the bus bar.

15. The battery module of claim 14, further comprising a fixing plate in which a plurality of exposure holes corresponding to the holes of the bus bar are formed, wherein the bus bar is located between the support plate and the fixing plate and is fixedly supported thereby.

16. The battery module of claim 15, wherein the fixing plate is configured to be coupled with the support plate to fix the bus bar.

17. The battery module of claim 15, wherein the plate of the bus bar includes a plurality of protruding portions formed at a periphery of each of the plurality of holes of the bus bar, and
wherein the plurality of exposure holes are formed larger than the protruding portions so that the plurality of protruding portions are exposed to the outside of the exposure holes.

18. The battery module of claim 14, wherein a bent portion is formed at the electrode tabs, respectively; and
the bent portion is supported to be in contact with one side of any one of the support holes.

* * * * *